UNITED STATES PATENT OFFICE.

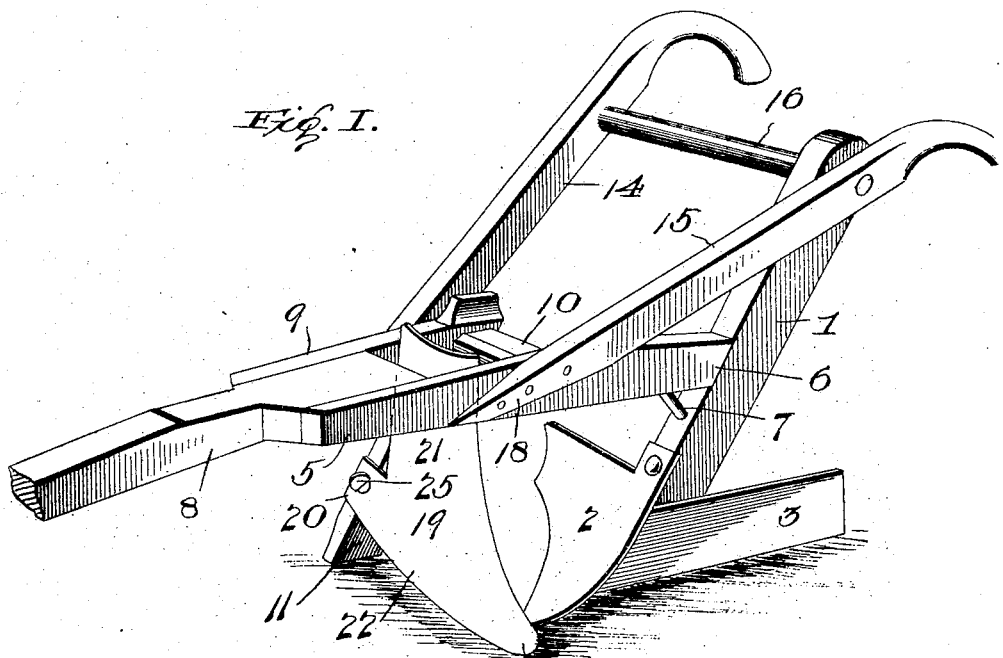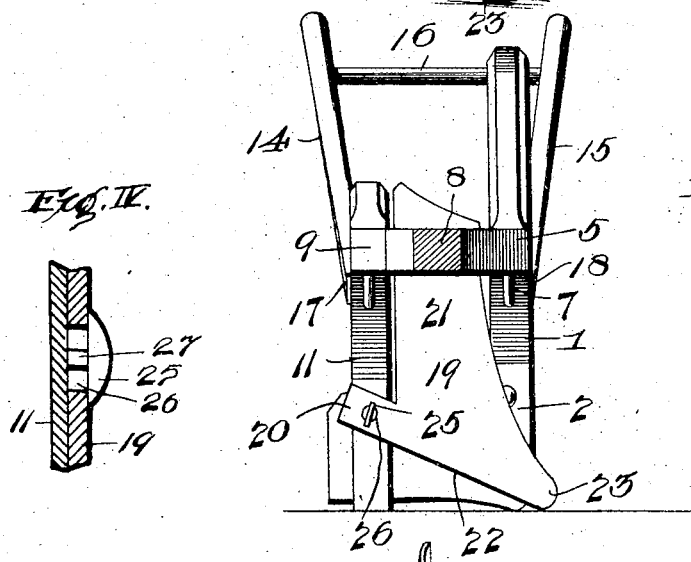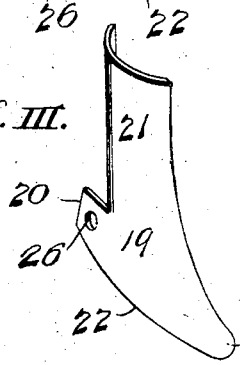

ELIJAH YARBROUGH, OF JESUP, GEORGIA.

PLOW.

No. 796,951.        Specification of Letters Patent.        Patented Aug. 8, 1905.

Application filed August 30, 1904. Serial No. 222,739.

*To all whom it may concern:*

Be it known that I, ELIJAH YARBROUGH, of Jesup, in the county of Wayne, State of Georgia, have invented certain new and useful Improvements in Plows, of which the following is a specification.

The object of my invention is to produce a plow adapted, especially in thin light soils, for throwing a furrow wide open at a minimum expenditure of draft energy.

My invention while of special serviceability in soil such as has been described may be employed to advantage also in other kinds of soils, and I accomplish the result aimed at in large measure by providing ahead, preferably, of the plow proper a member which operates somewhat like a colter, but which is not a colter in the ordinary acceptation of that term, inasmuch as it produces a sweep of a superficial layer of the soil to one side of the line of travel and in advance of the plow proper.

The term "sweep" employed in the foregoing description is used in contradistinction to the cutting action of an ordinary colter or plow proper in that the advance member of my plow acts as a lateral scraper to brush aside the surface earth, to which it is presented at an angle which offers the least resistance to the advance of the plow, thereby imposing a minimum addition of draft thereon. The operation of the fore-blade or sweep tends directly to relieve the work imposed upon the plow proper in proportion to the depth of the layer which it removes and which may be varied through variation of the curve of the fore-blade, as well as by vertical and lateral adjustment thereof with respect to the plow proper, which follows it.

What constitutes my invention will be hereinafter specified in detail and succinctly set forth in the appended claims.

In the accompanying drawings, which form a part of this specification, Figure I is a perspective view of the essential elements of my plow in its preferred form of embodiment. Fig. II is a front elevation of the subject-matter of Fig. I, and Fig. III is a perspective view of the fore-blade of my plow detached. Fig. IV is a detail sectional view showing the means of adjustably securing the fore-blade to its standard.

Referring to the numerals on the drawings, 1 indicates an ordinary plow-standard, which is shod with any suitable or preferred form of blade or plow proper—such, for example, as the share and moldboard 2 and landside 3. To the standard 1 is operatively secured analogously to the ordinary method of securing the same a beam, which, however, to adapt the frame to the functions required of it is preferably made of somewhat more complex structure than the ordinary beam. For example, if the plow-stock be made, as it preferably is, of wood the beam structure consists, preferably, of a member 5, which, secured at one end in the usual manner, as indicated at 6, to the stock, is provided with a brace-rod 7.

8 indicates the beam proper, which, secured at its rear end to the member 5, is provided upon its opposite side with a member 9, preferably opposite and parallel to the member 5, to which at its rearward end it is connected, as by a cross-piece 10.

11 indicates an auxiliary standard, which being secured to the member 9 extends preferably in advance and to one side of the standard 1, to which it is preferably made parallel.

14 and 15 indicate the handles of the plow, which being secured to the standard 1, as by a rung 16, to the opposite ends of which they are respectively fastened, are respectively secured to the members 9 and 5, as indicated by reference-numerals 17 and 18 in Figs. I and II.

The beam proper, 8, preferably has a downward pitch from its junction with the members 5 and 9 in order to obtain for the plow a desirable angle of inclination for the draft thereof.

The auxiliary standard 11, as has been specified, is preferably located in advance of the standard 1; but for some work it might perhaps be placed in the rear thereof, which, however, I should regard as affording no advantage, but rather disadvantage, over my preferred form of embodiment, however much it might appear to constitute a structural variation in the device.

Upon the auxiliary standard 11 I provide a sweeping-blade, which in the construction shown is a fore-blade 19, which is preferably provided with a lateral lug 20 for attaching it to the standard 11, with a transverse breastplate 21, a curved lower edge 22, and a point 23, curved to the rear. The fore-blade is preferably made susceptible of vertical and lateral adjustment upon its supporting member 11. The degree of adjustment need not be great, and the means provided for the purpose may consist of a bolt provided with an oblong head 25, the shank 27 of which is accommodated within an aperture 26 of so much greater diameter as to permit the desired adjustments of the blade underneath the confining-head 25 of the bolt. The breastplate 21 of the fore-blade preferably projects upwardly through an aperture defined by the members 5, 8, 9, and 10 and may bear against the end of the beam 8, to which it may be secured, although ordinarily I prefer to have it merely rest against the same without being positively secured to it.

In operation the plow being made subject to draft applied in the usual manner to the forward end of the beam 8 it is manipulated through the handles 14 and 15 in the ordinary manner, the plow proper, of whatever variety it be, performing its customary office. Ahead of the plow and preferably to one side of its travel the point 23 of the fore-blade enters the earth along the line of travel to which it has been previously adjusted and pushes aside by a sidewise skimming or sweeping action the layer of earth required of it. The edge 22 of the fore-blade is preferably downwardly inclined toward the point 23 thereof, as clearly shown in Fig. II, whereby the real cut of the fore-blade is made by the point 23 thereof, which may be operated to advantage in a horizontal plane substantially identical with the lower edge of the landside 3.

What I claim is—

1. The combination with a plow proper, of a sweeping-blade, having a point curved to the rear the two being coöperatively assembled to open a furrow, substantially as specified.

2. The combination with a plow-stock and plow proper, of a fore-blade operatively secured to the stock in advance of the plow proper, and having a point curved to the rear substantially in line with the plow proper.

3. The combination with a plow-stock and plow proper, of a fore-blade operatively secured to the stock in advance of the plow proper, and having a point curved to the rear substantially in line with the plow proper, said point being defined by a downwardly-inclined edge from the fore-blade.

4. The combination with a plow-stock and standard provided with a plow proper, of an auxiliary standard and fore-blade secured thereto and having a point curved to the rear.

5. The combination with a plow-stock and standard provided with a plow proper, of an auxiliary standard and fore-blade having a point curved to the rear and having a lug, secured thereto.

6. The combination with a plow-stock, standard, and plow proper, of a beam provided with an aperture, an auxiliary standard, and a fore-blade secured to the auxiliary standard and provided with a depending point curved to the rear and with a breastplate extending into said aperture.

7. The combination with a plow-stock, standard, auxiliary standard, a plow proper and fore-blade secured thereto respectively and beam members connected therewith, of a beam secured between said beam members.

8. The combination with a plow-stock, standard, auxiliary standard, a plow proper and fore-blade secured thereto respectively and beam members connected therewith, of a beam secured between said beam members, said beam having a downward pitch from its point of junction with said beam members.

9. The combination with a plow-stock, standard, auxiliary standard, a plow proper and fore-blade secured thereto respectively and beam members connected therewith, of a beam secured between said beam members, and a cross-piece uniting the beam members in the rear of the beam.

10. The combination with a plow-stock and plow proper, of a fore-blade operatively secured to the stock in advance of the plow proper and having a point curved to the rear and substantially in line with the plow proper, and means of adjustment of the fore-blade.

In testimony whereof I have hereunto signed my name in the presence of two subscribing witnesses.

ELIJAH YARBROUGH.

Witnesses:
A. B. COBURN,
JULIAN H. MORRIS,